(12) United States Patent
Sun et al.

(10) Patent No.: US 7,950,020 B2
(45) Date of Patent: May 24, 2011

(54) SECURE OPERATING SYSTEM SWITCHING

(75) Inventors: Jun Sun, Fremont, CA (US); Dong Zhou, San Jose, CA (US)

(73) Assignee: NTT Docomo, Inc., Tokyo (JP)

( * ) Notice: Subject to any disclaimer, the term of this patent is extended or adjusted under 35 U.S.C. 154(b) by 1106 days.

(21) Appl. No.: 11/724,016

(22) Filed: Mar. 13, 2007

(65) Prior Publication Data

US 2008/0092145 A1 Apr. 17, 2008

Related U.S. Application Data

(60) Provisional application No. 60/783,286, filed on Mar. 16, 2006.

(51) Int. Cl.
*G06F 9/44* (2006.01)
*G06F 9/00* (2006.01)
(52) U.S. Cl. .................... 719/319; 719/312; 713/100
(58) Field of Classification Search .......... 719/310, 719/312, 319; 713/100
See application file for complete search history.

(56) References Cited

U.S. PATENT DOCUMENTS

| | | | |
|---|---|---|---|
| 6,393,560 B1 | 5/2002 | Merrill et al. | |
| 7,434,224 B2 * | 10/2008 | Lescouet et al. | 718/108 |
| 2001/0018717 A1 | 8/2001 | Shimotono | |
| 2004/0205755 A1 * | 10/2004 | Lescouet et al. | 718/100 |
| 2007/0022421 A1 * | 1/2007 | Lescouet et al. | 718/1 |
| 2007/0074223 A1 * | 3/2007 | Lescouet et al. | 718/108 |
| 2007/0078891 A1 * | 4/2007 | Lescouet et al. | 707/104.1 |
| 2008/0155542 A1 * | 6/2008 | Maigne et al. | 718/100 |
| 2009/0320048 A1 * | 12/2009 | Watt et al. | 719/319 |

FOREIGN PATENT DOCUMENTS

| | | |
|---|---|---|
| WO | WO2005/036405 | 4/2005 |
| WO | WO 2005/036405 A | 4/2005 |

OTHER PUBLICATIONS

Seal, D.: "ARM Architecture Reference Manual," Addison-Wesley Professional 2000, pp. A1-1-A10-35.
Korean Patent Application for corresponding Korean Patent Application No. 2008-7022520, May 27, 2010, 4Pgs.
R.J. Creasy, The Origin of the VN/370 Time-Sharing System, IBM Journal of Research and Development, vol. 25, pp. 483-490, 1981.
B. Dragovic, K. Fraser, S. Hand, T. Harris, A. Ho, I. Pratt, A. Warfield, P. Barham, R. Neugebauer, "Xen and the Art of Virtualization," in Proceedings of the ACM Symposium on Operating Systems Principles, Oct. 2003.
A. Whitaker, M. Shaw, S. Bribble, "Denali: Lightweight Virtual Machines for Distributed Networkds Applications," in Proceedings of the USENIX Annual Technical Conference, Monterey, CA Jun. 2002.
International Search Report mailed Aug. 7, 2008 for PCT/US07/006663, filed Mar. 16, 2007, 3 pages.
Written Opinion of the International Searching Authority mailed Aug. 7, 2008 for PCT/US07/006663, filed Mar. 16, 2007, 6 pages.

* cited by examiner

*Primary Examiner* — Van H Nguyen
(74) *Attorney, Agent, or Firm* — Blakely, Sokoloff, Taylor & Zafman LLP (57) ABSTRACT

A method and apparatus is disclosed herein for secure operating system switching. In one embodiment, the method comprises identifying a second operating system of a plurality of operating systems that is to be active next; causing a memory access controller to enable exclusive access to a portion of memory for the second operating system once the second operating system becomes active; and causing the second operating system to become active.

22 Claims, 9 Drawing Sheets

1. OS switching initiated in OS #1, either by user or an OS event;

2. Kernel in OS #1 saves and shuts off various sub-systems (process, memory, timers, etc)

3. Drivers in OS #1 saves and shuts off hardware devices

4. CPU exits OS #1 and enters the OS switcher;

5. OS switcher identifies next active OS, OS #2; OS switcher performs housing keeping activities for the switching (logging, additional saving and restoring, etc)

6. OS switcher sets up the memory access controller such that only the memory that belongs to next active OS is accessible after step 6. Continuing monitoring for memory access violation may be necessary.

7. OS switcher jumps to the system resume function in OS #2;

8. Drivers in OS #2 restore hardware device states;

9. Kernel in OS #2 restores and resumes the operation of various sub-systems (process, memory, timers, etc)

10. OS #2 resumes normal operations.

Figure 1

```
Forcible OS switching:

1. OS switching initiated in OS #1, either by user or an
     OS event;
  2. OS #1 fails to complete suspend procedure and does not
     enter the OS switcher
  3. Forcible switching event happens (e.g., timer expires)
     and control goes back to OS switcher
  4. OS switcher recognizes this is a forcible OS switching;
     it identifies next active OS, OS #2; OS switcher
     performs housing keeping activities for the switching
     (e.g., marking OS #1 as in shutdown state)
  5. OS switcher jumps to the system resume function in OS
     #2;
  6. Drivers in OS #2 restore hardware device states;
  7. Kernel in OS #2 restores and resumes the operation of
     various sub-systems (process, memory, timers, etc)
  8. OS #2 resumes normal operations.
```

```
Forcible OS switching with 2-second delay policy implemented
with TrustZone:

Start up:
   1. Mark switching button and one dedicated timer as secure
      devices;
   2. Route their interrupts to OS switcher;

Forcible switching scenario:
   1. User presses switching to initiate OS switching;
   2. The interrupt is routed to OS switcher; OS switcher
      sets up a 2-second timer
   3. OS switcher forwards the interrupt to OS #1, the
      current active OS;
   4. OS #1 fails to complete suspend procedure within 2
      seconds;
   5. Timer expires; the interrupt is routed to OS switcher;
   6. OS switcher recognizes this is a forcible OS switching;
      it identifies next active OS, OS #2; OS switcher
      performs housing keeping activities for the switching
      (e.g., marking OS #1 as in shutdown state)
   7. OS switcher jumps to the system resume function in OS
      #2;
   8. Drivers in OS #2 restore hardware device states;
   9. Kernel in OS #2 restores and resumes the operation of
      various sub-systems (process, memory, timers, etc)
   10.  OS #2 resumes normal operations.
```

SECURE OPERATING SYSTEM SWITCHING

PRIORITY

The present patent application claims priority to and incorporates by reference the corresponding provisional patent application Ser. No. 60/783,286, titled, "Secure Operating System Switching," filed on Mar. 16, 2006.

FIELD OF THE INVENTION

The present invention relates to the field of operating systems in computer systems; more particularly, the present invention relates to switching between the use of operating systems on a computer system.

BACKGROUND OF THE INVENTION

A computer system consists of many hardware components, such as, for example, a CPU, RAM, disks, keyboard, monitor, serial ports, and etc. Some others are slightly more abstract but equally interesting to the running of an OS, such as interrupts, PCI bus, etc.

When there is only one OS running in the system, the OS sees, owns and manages all the hardware components in the system.

In recent years, people are putting more than one operating system (OS) on the same computer. In enterprise server arena, such a feature would allow one server to be put into one VM and leads much better manageability. In software development, it enables developers to quickly test out software portability on various OSes and various versions of the same OS. Even in personal computing, people are using multiple OSes for supporting different applications and for testing out new OS versions, or even testing downloaded software. On embedded devices such as smartphones, people can have two OSes for different purposes: one for private usage and one for business.

The predominant technique for multi-OS is virtual machine (VM) technology, which was originally developed by IBM for mainframe computers. Recently, there is renewed interests in VM technology, including new products and research projects such as VMW. They offer good security and isolation. However, they typically do suffer from performance loss. One study shows VM techniques can slow down the application anywhere from 10% to 80% depending on the application.

Additionally, implementation and porting of VM technology are complex. For example, in order to support guest OSes well, all underlying devices need to be virtualized one way or the other in order for access by the guest OS. With a growing list of new hardware coming out everyday, this restriction may limit the applicability of VM-based approaches.

Simple solutions exist that do not have these problems for the application scenarios that do not require multiple OSes running concurrently. There are multi-boot solutions such as GRUB from GNU.org and BootMagic from PowerQuest (Symantec). There are also some hardware swapping and manual selection schemes that let one to choose different booting devices and effectively enable multiple OSes running on the same computer. Unfortunately, the slow and cumbersome switching process limits the scope of its application.

OS switching is another alternative for supporting multiple OSes. Operating System (OS) switching is a technique that enables multiple operating system (OSes) to run concurrently on the same computer. In one embodiment, each OS owns a portion of the system memory and storage and takes turns running. In one embodiment, switching from one OS to another is achieved through modifying suspend/resume functions in the power management module.

When multiple OSes run concurrently, one fundamental question is how each hardware component is exported to each OS. Three fundamentally different techniques exist: exclusive partition, time multiplexing, and abstraction. In exclusive partition, a hardware component belongs to one OS exclusively and it is never accessed by any other OSes in the system. For example, memory can be split into two halves, where each of the two OSes owns one half. For another example, the Ethernet controller can be assigned to one OS, while other OSes either don't access Ethernet or access it indirectly through talking to the owner OS. In time multiplexing, at any time, one OS owns the hardware component and manages it exclusively. From time to time, however, the ownership may switch from one OS to another. The CPU is typically shared this way. In Abstraction, an OS does not see and manage the real hardware component; instead it accesses the hardware through another layer of software. Virtualization is a special form of abstraction, where the interface of the abstraction software looks like a traditional device instead of typical functional call interface.

A multi-OS solution can use a combination of the above techniques. Even for the same hardware component, it is possible to combine different techniques. For example, an Ethernet controller can exclusively belong to one OS. If an application in this OS implements virtual Ethernet controllers and exports them to other OSes, then other OSes, can indirectly access the Ethernet controller through the abstract interface of the virtual Ethernet controllers.

VM-based multi-OS solutions employ abstraction, or virtualization, for managing most hardware components. Multi-boot solutions, on the other hand, use time multiplexing for the whole system through rebooting.

An example of an OS switching technique is described in U.S. Patent Application No. 20010018717A1, entitled "Computer System, Operating System Switching System, Operating System Mounting Method, Operating System Switching Method, Storage Medium, and Program Transmission Apparatus," filed Aug. 30, 2001, where multiple OSes are supported without attempting to virtualize any hardware components.

Existing OS switching solutions such as described in U.S. Application No. 20010018717A1 do not offer strong isolation between multiple OSes. One problem with the OS switching is a lack of strong isolation and protection among OSes, which are exhibited in a lack of memory isolation and a lack of forced control transfer. More specifically, with respect to a lack of memory isolation, all OSes share the same physical memory. When an OS kernel runs in the privilege mode, it is capable of modify any memory contents, including those belonging to other OSes and an OS switcher. If it does so, either due to bugs or malicious viruses, other OSes and even the whole system will crash. Also, with respect to the lack of forced control transfer, the implementation described above relies on the current active OS giving up CPU and enters OS switcher in order to perform an OS switching. Potentially a buggy or maliciously hacked OS may never enter the OS switcher. As a result, other OSes are effectively suspended forever unless the whole system is shutdown and reboots. Thus, these implementations of OS switching have security holes, mainly due to lack of memory isolation and force control transfer.

SUMMARY OF THE INVENTION

A method and apparatus is disclosed herein for secure operating system switching. In one embodiment, the method comprises identifying a second operating system of a plurality of operating systems that is to be active next; causing a memory access controller to enable exclusive access to a portion of memory for the second operating system once the second operating system becomes active; and causing the second operating system to become active.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Secure Operating System (OS) switching is described. With underlying hardware support, the disclosed OS switching is implemented with strong isolation. In one embodiment, secure OS switching uses TrustZone technology of ARM Holding, Inc. of Cambridge, U.K. and VT-x technology of Intel Corporation of Santa Clara, Calif.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Secure OS Switching

To perform the secure OS switching, a logically independent piece of software referred to as the OS switcher is used. In one embodiment, when the CPU is executing OS switcher code, the CPU is in the switcher mode. Otherwise, for purpose herein, the CPU is operating in legacy mode.

In one embodiment, OS switching emulates multiple computer systems in one, where at any time only one of them is active and others are suspended. Special care is taken during OS switching, as OS kernels typically are not ready to deal with the sudden loss of hardware ownership or loss of CPU execution control. For exclusively partition resources, if the device does not generate asynchronous events such as interrupts, then software typically does not observe any side effect of OS switching. If the device generates asynchronous events, then software needs to be aware of possible loss of such events when the current OS is switched off. Alternatively, the current OS can shutdown the device prior to being switched off so that it won't generate any synchronous event while the OS is switched off. For time-multiplexed resources, a time-multiplexed device is accessed by multiple OSes during OS switching. It is imperative to save its state before the current OS is switched off and restore the original state when the original OS is switched on again. Of course, if the device is capable of generating asynchronous events, the OS needs to be aware of the possible loss of such events when the current OS is switched off. Therefore, the OS power suspend and resume functions are used.

In principle, an active OS performs a suspend function immediately prior to being switched off. The next active OS performs a resume function to resume its normal operation. The suspend/resume functions exist in most modern OSes so that a computer can goes into a suspend mode without consuming any power. Upon certain pre-configured events, the system can quickly resume its operation again, typically within less than a one second time frame.

In one embodiment, the OS power suspend function includes the following operations: the system suspend function being initiated either by a user or an OS/BIOS event, the kernel of the OS being suspended saving and shutting off various subsystems (e.g., process, memory, timers, etc.), drivers in the OS being suspended saving and shutting off hardware devices, and the OS or BIOS instructing the CPU and the entire system to enter the suspend mode. The entire system in this case consists of the currently running (active) OS, all time multiplexed hardware resources and any partitioned hardware resources that belong to the currently active OS. As for one embodiment of the OS power resume function, the following functions are performed: the drivers in the OS being resumes restore hardware, the kernel in the OS being resumes restores and resumes the operation of various subsystems (e.g., process, memory, timer, etc.), and the entire system resumes normal operation.

In one embodiment, system memory is partitioned among OSes and the OS switcher. Except for memory and storage, all other hardware resources are time-multiplexed. The OS that currently owns all the time-multiplexed resources (including the CPU) is referred to herein as the active OS or the currently active OS.

Strong Memory Isolation

In order to fix these security holes, certain hardware capability is used. For stronger memory isolation, a memory access controller is used, which gives the ability to disable the access to certain memory regions during legacy mode. Furthermore, in one embodiment, any modifications to memory access controller only occur when the CPU is in switcher mode. Otherwise, an OS can modify the controller so that it can gain access to all the memory.

With these capabilities, one embodiment of an OS switching implementation is as follows. When the system starts up, the CPU is in switcher mode so that it can setup accessibility for any memory regions. Each time CPU control goes to the next active OS, either booting for the first time and resumption from previous execution, the OS switcher sets up the memory access controller so that only memory regions that belong to the next active OS are enabled for access in legacy mode. If necessary, the OS switcher continuously monitors to make sure the active OS does not access the memory region that does not belong to it.

Figure 1:
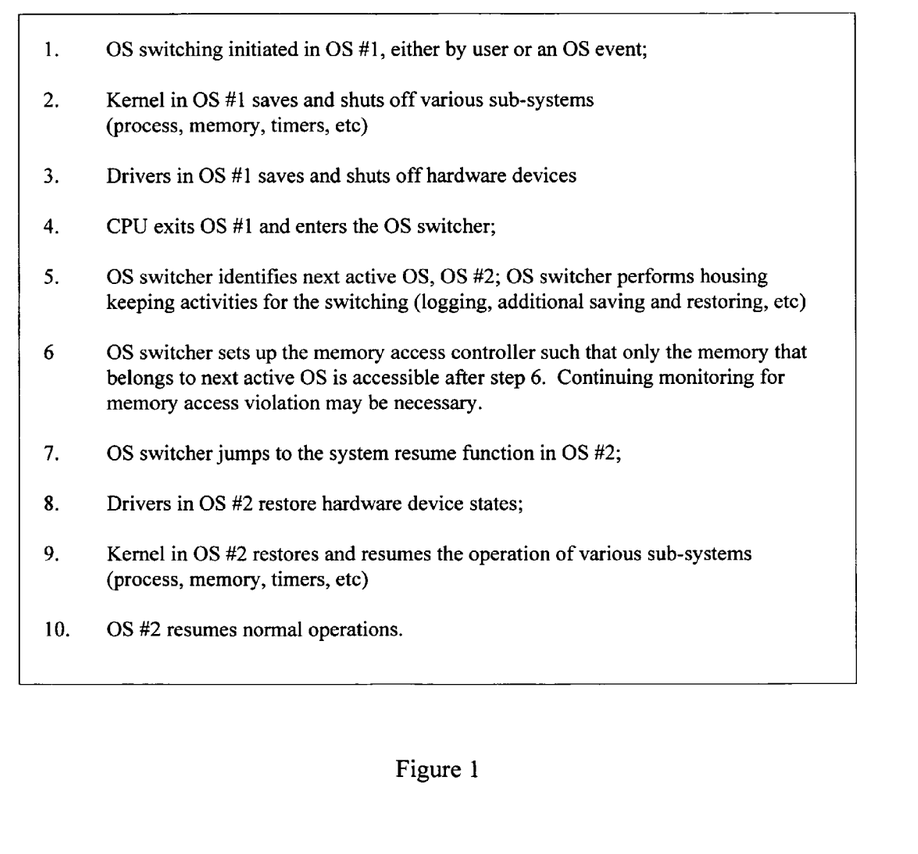
FIG. 1 illustrates one embodiment of OS switching pseudo-code for performing OS switching between two OSes.

FIG. 1 illustrates one embodiment of OS switching pseudo-code for performing OS switching between two OSes. Referring to FIG. 1, the OS switching process begins with a OS switching being initiated in OS #1 (1). OS switching may be initiated by a user or an OS event. In response to OS switching being initiated, the kernel in OS #1 saves and shuts off various subsystems (e.g., process, memory, timers, etc.) (2) and drivers in OS #1 saves and shuts off hardware devices (3). Thereafter the CPU exits OS #1 and enters the OS switcher (4).

The OS switcher identifies the next OS, namely OS #2 and performs housekeeping activities for switching (e.g., logging to log data for management, accounting, or debugging purposes, additional saving and storing, etc.) (5). The OS switcher sets the memory access controller such that only memory that belongs to the next active OS is accessible after the OS #2 resumes (6). In one embodiment, the OS switcher continues to monitor for memory access violations after OS #2 resumes.

Then the OS switcher jumps to the system resume function in OS #2 (7). When performing the system resume function, the drivers in OS #2 restore the hardware device states (A) and the kernel in the OS 2 restores and resumes the operations of various subsystems (e.g., process, memory, timers, etc.) (9). Thereafter, OS #2 resumes normal operations (10).

In one embodiment, the switcher code itself is hidden in legacy mode as well. This is important because otherwise any OS can modify the OS switcher code in order to relax the accessibility constraints for itself.

Figure 8:
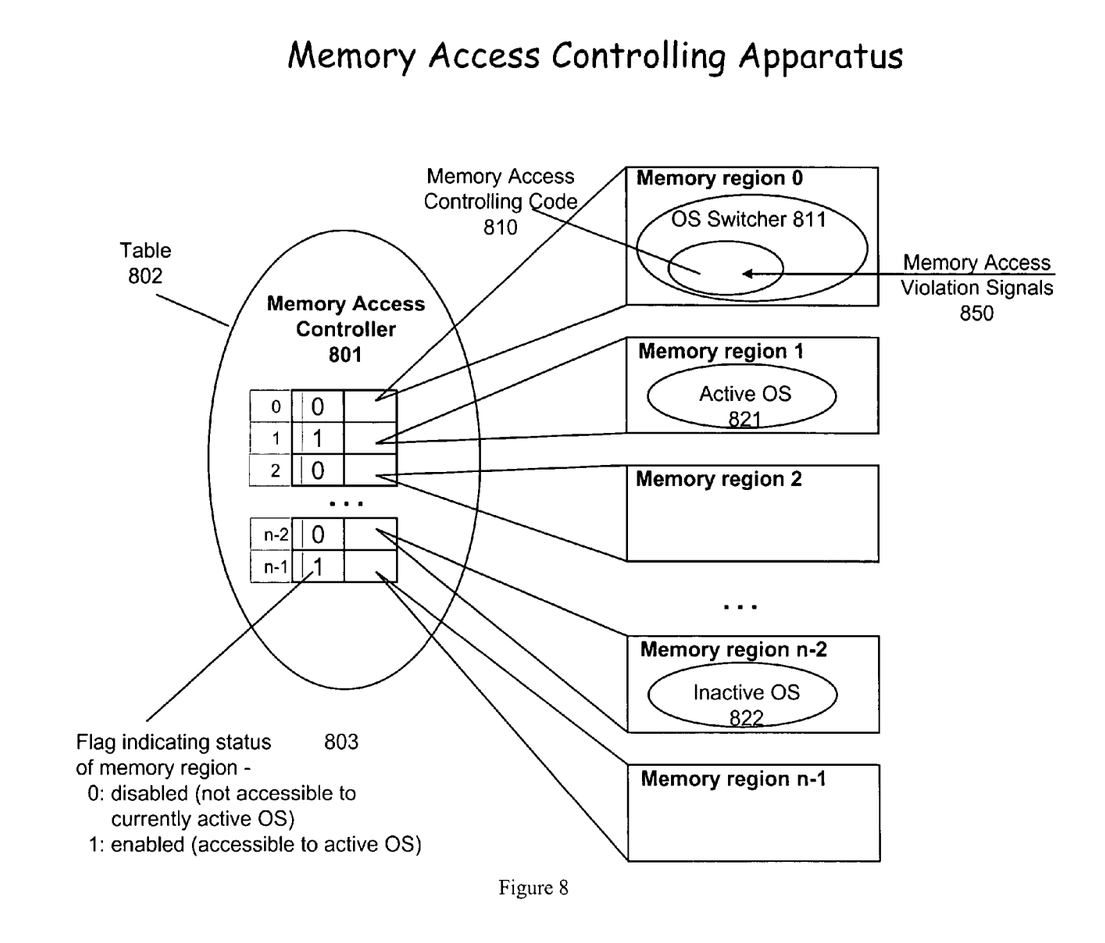
FIG. 8 is a block diagram of one embodiment of a memory access controller.

Memory access control is performed by a memory access controller. FIG. 8 is a block diagram of one embodiment of a memory access controller. Referring to FIG. 8, memory access controller 801 includes table 802 with n rows. Each row in table 802 corresponds to a region in memory. For example, the first row corresponds to memory region 0, the second row corresponds to memory region 1, the third row corresponds to memory region 2, and so on until the second to last row corresponding to memory region n-2 and the last row corresponding to memory region n-1. The row includes the address of the memory region as well as a flag 803 that indicates the status of the memory region. In one embodiment, a status of 0 indicates that the region is currently disabled (not accessible to the currently active OS) and a status of 1 indicates that the region is currently enabled (accessible to the active OS).

In one of the memory regions, memory region 0 for example, is the memory access controlling code 810 to perform the memory controller operation. Memory access controlling code 810 is in OS switcher code 811 and, when executing on the system, sets flag 803 based on which OS is to be active and which is to be inactive as indicated by OS switcher code 811. Memory access controlling code 810 also receives memory access violation signals 850 to allow the memory access controller to handle memory access violations.

Forced Control Transfer

In one embodiment, in order to switch reliably, a determination is made as to when the currently active OS fails to cooperate and allow the OS switching to occur. This continue may be identified by determining that the currently active OS is not performing the suspend operation or has not completed the suspend operation in a predetermined period of time. When that happens, a forcible switching to switch off current active OS is performed. In one embodiment, when an OS is forcibly switched off, it cannot resume normally anymore. In such a case, a fresh boot is needed if this OS needs to run next time.

In one embodiment, switching is initiated through certain external events, such as, for example, but not limited to, a switching button being pressed or a special incoming packet being received. When to perform a forcible switching is based on certain policies. For example, one policy might be as follows: a forcible switching is performed a predetermined time (e.g., two seconds) after the switching button is pressed and if no switching has not happened yet. Another policy might be providing a dedicated forcible switching button.

In one embodiment, in order to implement different policies, different hardware support is used. In one embodiment, a two-second delay after switching the button press policy is implemented using a switching button and a time. In such a case, the OS switcher access to the switching button and a timer to determine whether the policy is being enforced. For purposes herein, these hardware resources are referred to as policy implementation hardware for forcible switching.

In one embodiment, to perform a control transfer during OS switching, hardware in the system is included so that events generated by policy implementation hardware are routed to the OS switcher and the states of policy implementation hardware and their event routing cannot be altered by OSes running in legacy mode.

In one embodiment, the OS switcher implements the forcible switching policy During system starting up, the OS switcher sets up policy implementation hardware states and their event routing to the OS switcher itself. The OS switcher also detects the initiation of OS switching and decides whether a forcible OS switching should be performed. If so, the OS switcher gains CPU control through an external source, marks the currently active OS as shutdown, and switches to the next OS.

Figure 2:
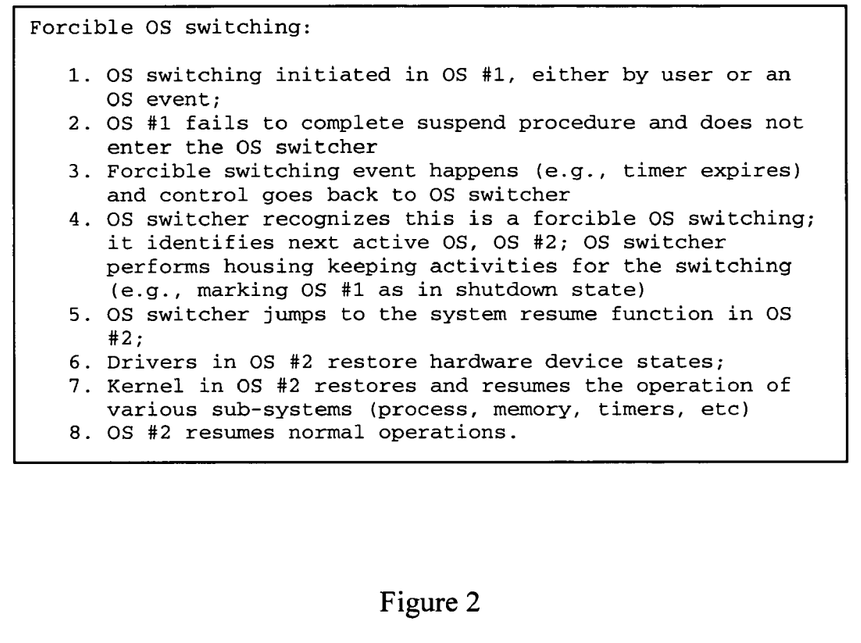
FIG. 2 illustrates pseudo-code that describes a generic scenario when a forcible OS switch happens when switching between OSes.

FIG. 2 illustrates pseudo-code that describes a generic scenario when a forcible OS switch happens when switching from OS #1 to OS #2. Referring to FIG. 2, the forcible OS switching process begins with OS switching that is initiated in OS #1 (1). This OS switching may be initiated by either the user or a OS event. After initiating OS switching in OS #1, OS #1 fails to complete a suspend procedure and does not enter the OS switcher (2). After this occurs, a forcible switching event happens and control goes back to the OS switcher (3). In one embodiment, the forcible switching event may the expiration of a timer.

In response to the forcible switching event, the OS switcher recognized that forcible OS switching is occurring (4). The OS switcher identifies the next OS, namely OS #2, and performs housekeeping activities for the switching (e.g., marking OS #1 as in the shutdown state). The OS switcher jumps to the system resume function in OS #2 (5). In this state, drivers in OS #2 restore hardware devices states (6) and the kernel in OS #2 restores and resumes the operation of various sub-systems (e.g., process, memory, times, etc.) (7). Thereafter, OS #2 resumes normal operations (8).

Figure 3:
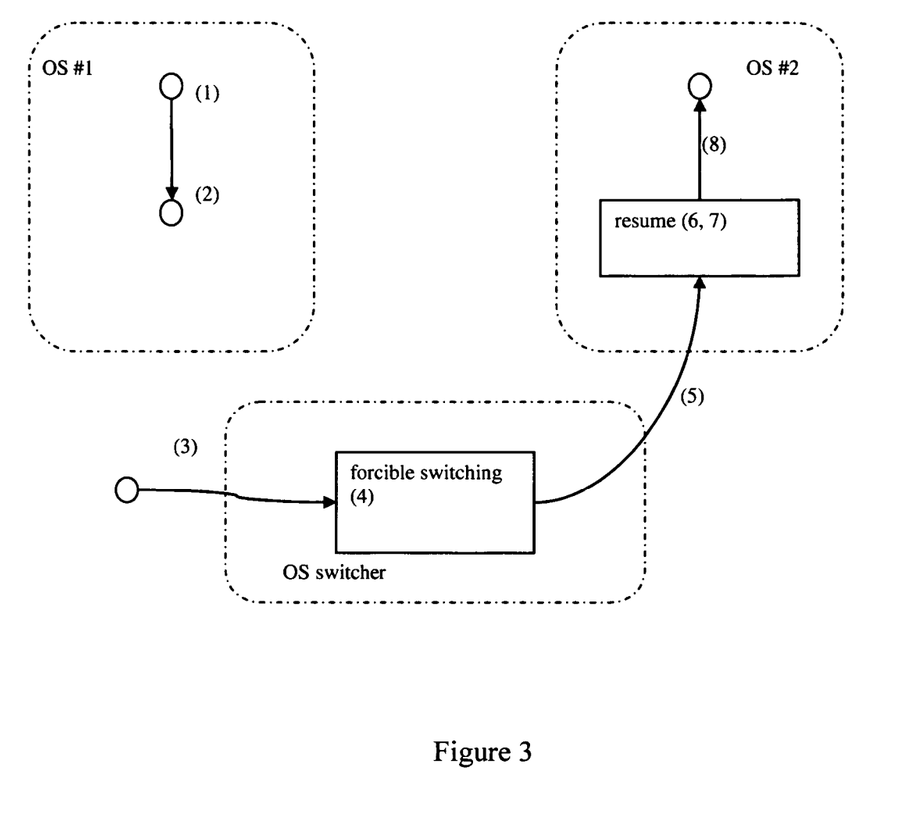
FIG. 3 illustrates the forcible OS switching depicted in FIG. 2.

FIG. 3 illustrates the forcible OS switching depicted in FIG. 2. Each of the operations set forth in FIG. 2 are shown in FIG. 3 as interactions with the OS switcher and two OSes, OS #1 and OS #2.

Figure 9:
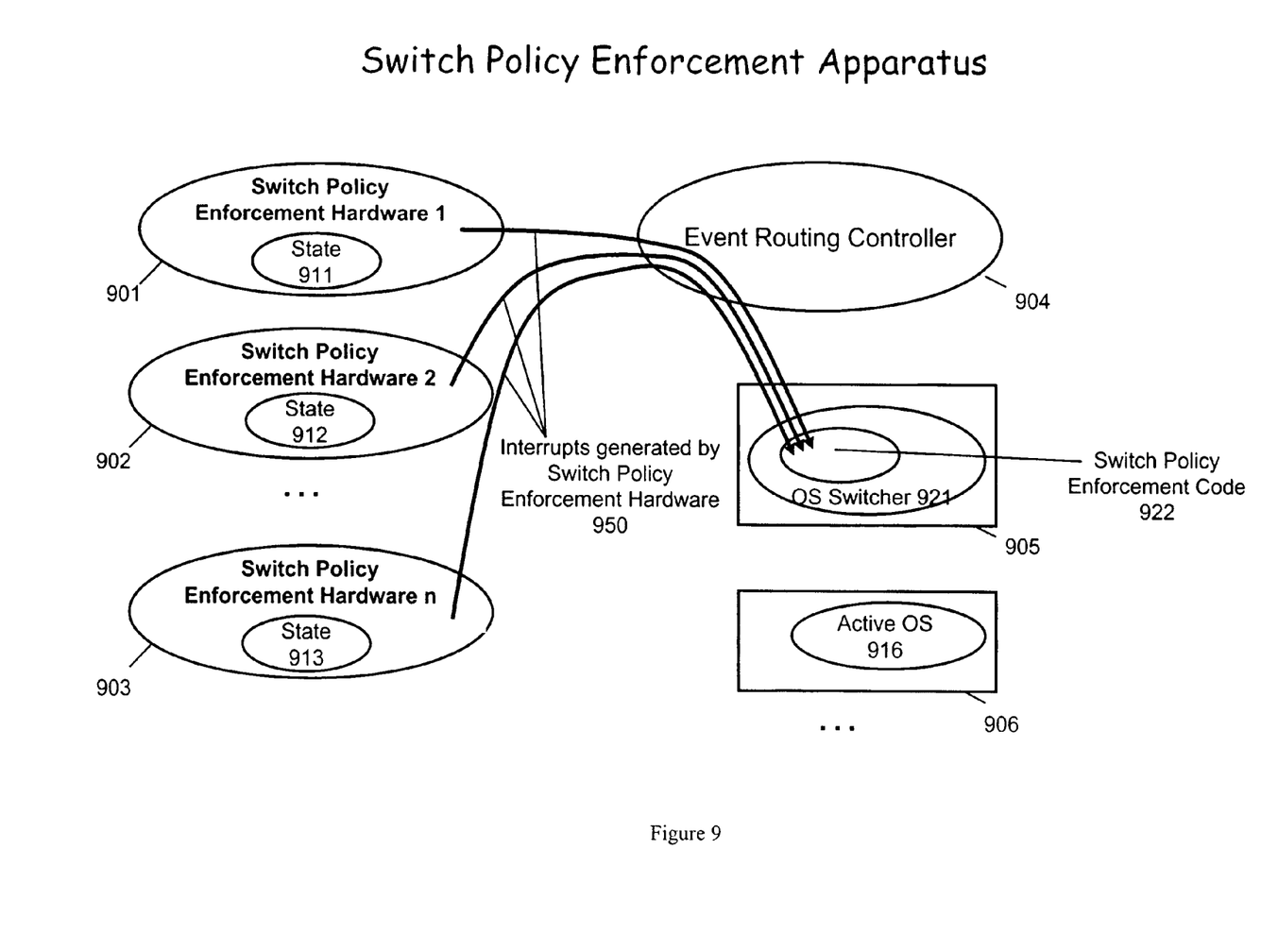
FIG. 9 is a block diagram of one embodiment of a switch policy enforcement apparatus.

Switch policy enforcement is controlled by a switch policy enforcement apparatus. FIG. 9 is a block diagram of one embodiment of a switch policy enforcement apparatus. Referring to FIG. 9, switch policy enforcement hardware 901-903 include state 911-913, respectively, and generate interrupts 950. Although only three blocks of switch policy enforcement hardware are shown, a system may have more or less than three. Interrupts 950 are routed by event routing controller 904 to switch policy enforcement code 922 executing on the system as part of OS switcher 921. OS switcher resides in memory region 905, while the active OS 916 resides in memory regions 906, which is distinct from memory region 905.

Note that switch policy enforcement hardware 901-903, event routing controller 904 and OS switcher 921 are objects that are not accessible to active OS 906, or objects whose state, namely state 911-913, cannot be modified by active OS 916.

Implementing Secure OS Switching

Figure 4:
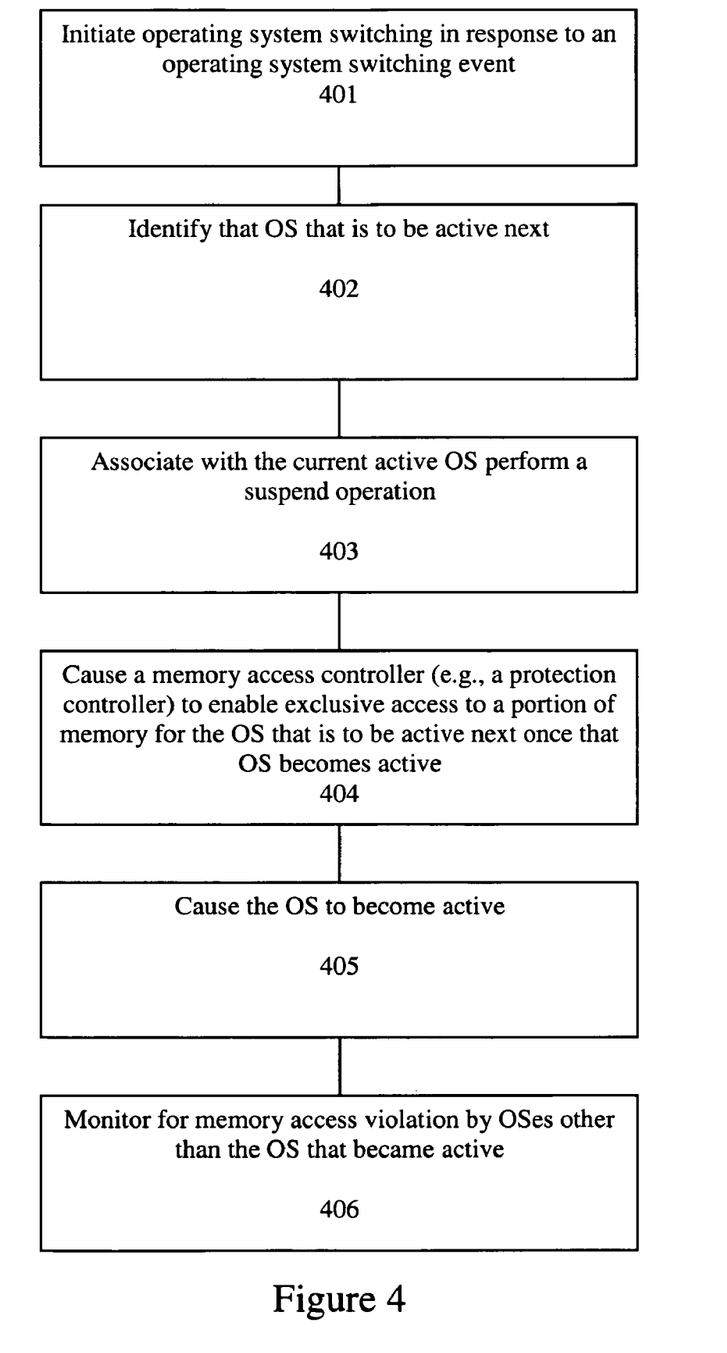
FIG. 4 is a flow diagram of one embodiment of a process for enabling a plurality of operating systems to run concurrently on a computer.

FIG. 4 is a flow diagram of one embodiment of a process for enabling a plurality of operating systems to run concurrently on a computer. The process is performed by processing logic that may comprise hardware (circuitry, dedicated logic, etc.), software (such as is run on a general purpose computer system or a dedicated machine), or a combination of both Referring to FIG. 4, the process begins with one OS being active and processing logic initiating operating system switching in response to an operating system switching event (processing block 401). In one embodiment, the OS switching event is a user event. In one embodiment, the OS switching event is generated in response to a switching button being depressed. In one embodiment, the switching button is mapped as a secure device with state that the OSes cannot alter and one or more interrupts that the OSes cannot block. In another embodiment, the switching event is generated after a timer reaches a predetermined time; the timer is trigger to run in response to the switching button being depressed.

In one embodiment, initiating operating system switching in response to an operating system switching event comprises determining that a forcible switching event occurred and performing a forced control transfer. In one embodiment, the forcible switching event occurs after a currently active operating system fails to fails to become inactive and fails to allow the one operating system to become active.

Once an OS switch has been initiated, processing logic identifies that OS that is to be active next (processing block 402).

In one embodiment, in response to the switching event, processing logic associated with the currently active OS performs a suspend operation (processing block 403). In one embodiment, the current OS performs a suspend operation by saving state associated with one or more sub-systems and one or more hardware devices.

After identifying the OS that is to be active next, processing logic causes a memory access controller (e.g., a protection controller) to enable exclusive access to a portion of memory for the OS that is to be active next once that OS becomes active (processing block 404). In one embodiment, causing the memory access controller to enable exclusive access to a portion of memory for the next active OS comprises statically partitioning memory into non-secure memory that is accessible by the second operating system and secure memory that is not accessible to the second operating system. In one embodiment, the secure memory and non-secure memory include portions of memory on a chip.

Next, processing logic causes the OS to become active (processing block 405). In one embodiment, causing the second operation system to become active comprises performing a resume operation for the newly active OS to cause the newly active OS to resume operation. In one embodiment, processing logic of the OS that is to be active next performs a resume operation by having one or more of its drivers restore hardware device states, having its kernel restore and resume operation of one or more subsystems, and then resume normal operation. In one embodiment, the process also includes receiving an indication to switch from the currently active OS to the next active OS and having the currently OS saving state associated with the currently active operating system. In one embodiment, this indication is received is in response to a user action or an operating system event.

After the next active OS becomes active, processing logic monitoring for memory access violation by OSes other than the OS that became active (processing block 406).

Implement Secure OS Switching with TrustZone

TrustZone is an extension to ARM CPU architecture available from ARM Holdings of Cambridge, U.K. TrustZone splits the CPU execution into secure mode and non-secure code. It classifies or partitions all other hardware resources into either secure resources or non-secure resources. When the CPU executes in non-secure mode, often referred to as the non-secure world, it can only access non-secure hardware resources. When CPU executes in secure mode, often referred to as the secure world, it can access both secure and non-secure hardware resources.

Furthermore, TrustZone can securely route certain interrupts into the secure environment.

In one embodiment, to implement secure OS switching, the following features from TrustZone are used:
- 'NS' bit—A new bit in the CPU status register to indicate whether the CPU is running in non-secure mode (NS=1). This is orthogonal to the existing privilege mode, user mode and a couple of other exception processing modes.
- Monitor mode—A CPU mode for switching the CPU between secure execution mode and non-secure execution mode. It can be entered through a new instruction (SMI) or certain mode-switching exceptions.
- Protection controller—A programmable controller that determines which peripheral devices can be accessed in non-secure and which ones cannot. In one embodiment, all peripherals controlled by this controller are divided into two classed: secure and non-secure. The access to secure devices can be granted only when the CPU is in secure mode.
- Interrupts—In the TrustZone architecture, two interrupt controllers are present. One for routing interrupts from secure devices and one for routing interrupts from non-secure devices. Using the interrupt scheme together with protection controller, it can be assumed secure devices events are delivered to the secure environment, which cannot be altered by non-secure world.

Implementing Secure OS Switching with TrustZone

There are numerous ways to use TrustZone to implement secure OS switching, as there are multiple ways to achieve memory isolation and forced control transfer. In the following discussion, a number of methods are described to implement secure OS switching.

As secure OS switching calls for two different CPU modes, namely switcher mode and legacy mode, in one embodiment, the legacy mode is mapped into the non-secure mode in TrustZone, where its memory access and CPU control can be constrained. The switcher mode is mapped into secure mode in TrustZone. In another embodiment, the switcher code can be implemented in the new monitor mode of TrustZone. Monitor mode in TrustZone can filter interrupts and allocate them to secure or non-secure environment. In one embodiment, the switcher code is implemented in monitor mode and is a useful alternative when the switcher code is small. In yet another embodiment, the switcher code is divided into two parts: a performance critical portion is put into the switcher mode (non-secure environment), while a performance non-critical portion, which can be much bigger in size, is put into the secure environment.

When the CPU runs the non-secure execution mode, it cannot access any peripheral devices that are secure devices, including memory chips. When memory chips are controlled by the protection controller, they can be dynamically classified as secure devices or non-secure devices.

For example, suppose the system has three memory chips that are statically partitioned such that one is for use by each of two OSes and the third is for the OS switcher. All memory chips are controlled by the protection controller of TrustZone. During OS switching, the switcher code, running in either monitor mode or secure execution mode, can modify the protection controller so that only the memory chip belonging to the next active OS is the non-secure memory device while marking the other two memory chips as secure devices. When next active OS is resumed, it can only access the memory chip that is marked as a non-secure device, but not the other two memory chips that are marked as secure devices. In one embodiment, the protection controller does this by storing bits in registers, which the addressing hardware will check at runtime.

In one embodiment, with the TrustZone-aware memory controller (i.e., memory controller that uses TrustZone's protection controller for memory protection), it is possible to dynamically configure portions of the same memory chip to be secure or non-secure. The basic operation is similar to the above scenario except that portions of memory are shared by multiple OSes and the TrustZone-aware memory controller controls the security attributes of these memory portions. In one embodiment, TrustZone uses patterns of bits to specify certain memory address should be secure.

In one embodiment, forcible OS switching is implemented with secure interrupt routing features in TrustZone. Different forcible OS switching policies require different implementations.

In one embodiment, a separate forcible OS switching button is included into the system. Such a system may include a regular OS switching button. When user presses the regular OS switching button and if the active OS fails to respond, the user can press the forcible OS switching button to initiate a forcible OS switching. In this case, the forcible switching button is mapped as a secure device so that OSes cannot alter its state or block its interrupts. Furthermore, its interrupt are routed through the secure interrupt controller and are forwarded to the secure environment where the OS switcher runs. Given this arrangement, control of the CPU inside the switcher code is guaranteed to occur when forcible switching button is pressed. The switcher can then continue to resume the next active OS in the system.

In one embodiment, a complicated forcible OS switching policy is implemented as well. For instance, the new policy may be used which, two seconds after pressing the switching button, initiates a forcible OS switching if the current active OS fails to enter OS switcher voluntarily. In this case, the OS switching button is mapped as secure device and needs a secure timer. When the switching button is pressed, the switcher code sets off the 2-second timer and forwards the event to the current OS. If the current active OS enters the OS switcher within two seconds, the timer is cancelled, and OS switching proceeds as normal. If the current active OS fails to do so, the 2-second timer expires and CPU control goes back to the switcher code, which can then decide to perform forcible OS switching.

Figure 5:
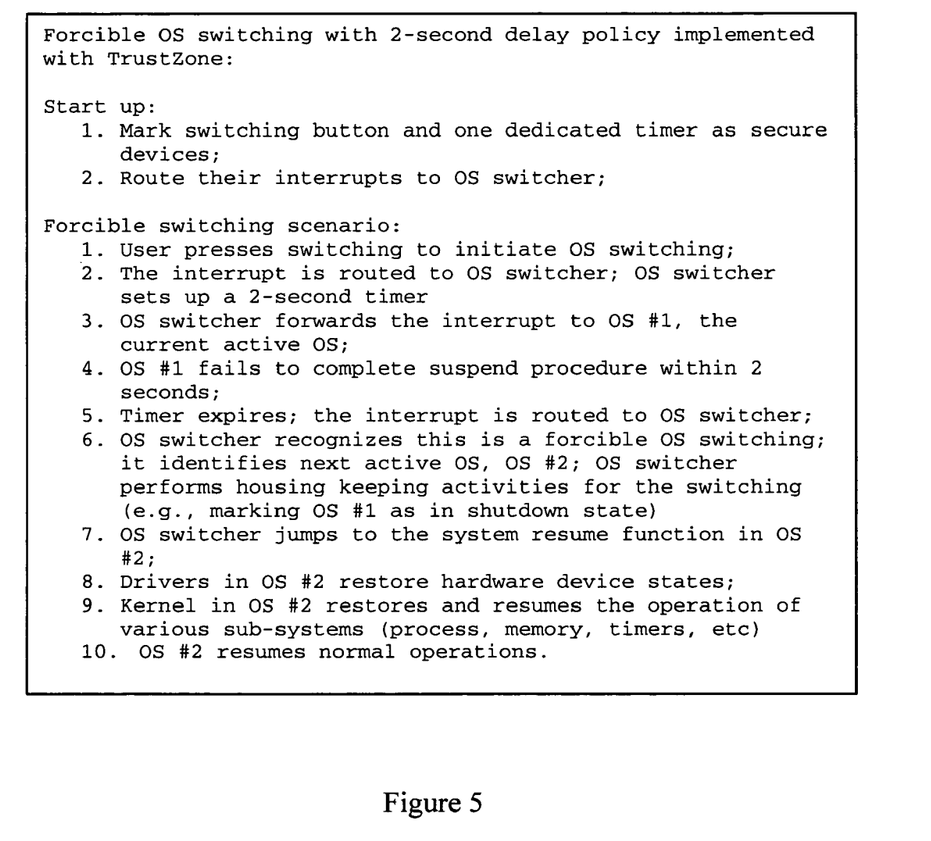
FIG. 5 illustrates pseudo-code to perform forcible OS switching with a delay

FIG. 5 illustrates pseudo-code to perform a forcible OS switching as discussed above with a 2-second delay policy. In this particular case, OS #1 fails to enter the OS switcher within two seconds after the initial press of switching button. As a result, the timer expires and the OS switcher performs a forcible switching to OS #2.

Referring to FIG. 5, pseudo-code begins with a start up process that includes a number of operations. First, the switching button and one dedicated timer are marked as secure devices (1). Next, the interrupts of the switching button and the dedicated timer to the OS switcher (2). Thereafter, the remainder of FIG. 5 sets for the forcible switching scenario.

In the forcible switching scenario of FIG. 5, the user presses the switching button to initiate OS switching (1). Next, the interrupt generated by switching button is routed to the OS switcher and the OS switcher sets up a 2-second timer (2). Next, the OS switcher then forwards the interrupt to OS #1, which is the current active OS (3). Note that in (3), the OS switcher has multiple ways to forward the interrupt to active OS. In one embodiment, the OS switcher forwards the interrupt through a special function call interface between the OS switcher and current active OS. In another embodiment, a hardware state is set up by the switcher such that when the OS switcher gives CPU control back to the current active OS, another interrupt occurs and that interrupt is routed to the active OS, instead of to the OS switcher.

After the OS forwards the interrupt to the current active OS, OS #1, then OS #1 fails to complete the suspend procedure within the two seconds (4). The timer then expires and the interrupt is then routed to the OS switcher (5). At this point, the OS switcher recognizes this is a forcible OS switching situation, identifies the next active OS, OS #2, and performs housekeeping activities for the switching (e.g., marking OS #1 as in a shut down state) (6).

Thereafter, the OS switcher jumps to the system resume function in OS #2 (7), the drivers in OS #2 restore hardware states (8), and the kernel in OS #2 restores and resumes the operation of various subsystems (e.g., process, memory, timers, etc.) (9). Then OS #2 resumes normal operation (10).

Figure 6:
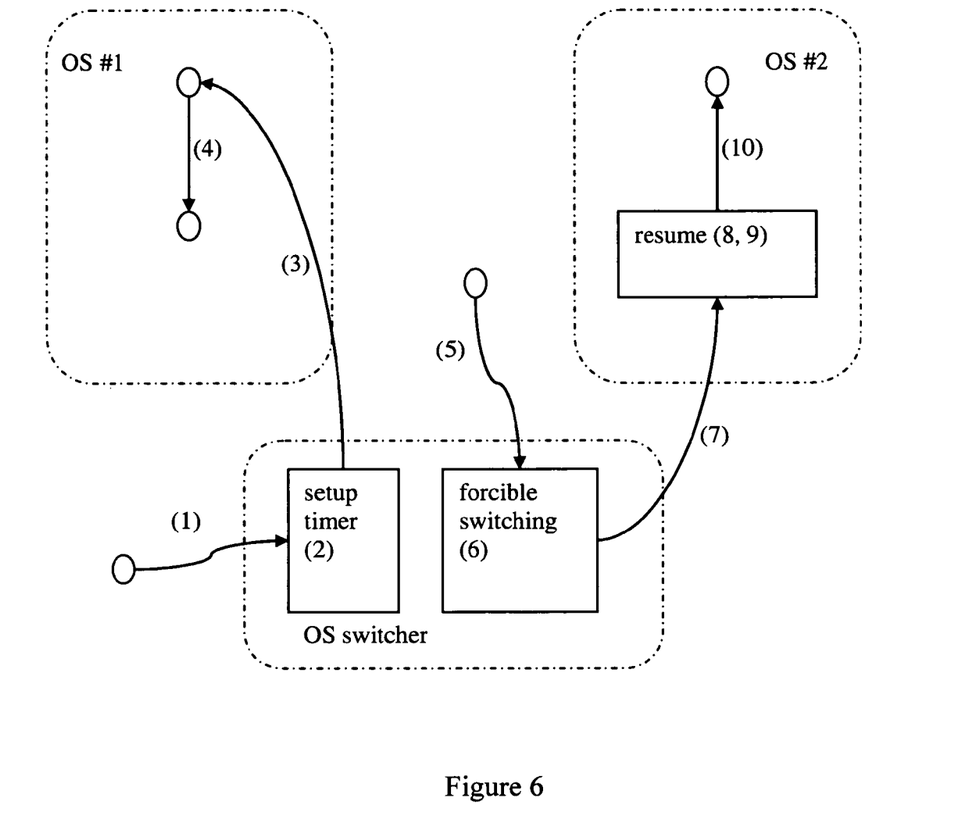
FIG. 6 illustrates the forcible OS switching scenario described in FIG. 5.

FIG. 6 illustrates the forcible OS switching scenario described in FIG. 5. As shown, OS #1 and OS #2 are shown interacting with OS switcher. Each of the operations described in conjunction with FIG. 5 are shown in parenthesis in FIG. 6 to implement forcible OS switching with a 2-second delay policy and a TrustZone implementation.

Implement Secure OS Switching with Intel's VT-x

Secure OS switching may be implemented with Intel's VT (Virtualization Technology), namely the specific version of VT for Intel IA-32 is called VT-x. In general with proper implementation of a virtual machine monitor (VMM), it is possible to run a legacy IA-32 compatible OS without any modification. Some features of VT-x used for secure OS switching are the following:

VMX root and non-root operations—While keeping all legacy features, a VT-x enabled CPU has two distinctive operation modes, referred to as root operation and non-root operation. Generally, the VMM runs in root operation mode, while guest OSes run in non-root operations. Various instructions are added to facilitate the operation mode transition. In addition, many configurable conditions are defined to automatically transfer from non-root operation to root operation mode.

Exception bitmap—In one embodiment, a 32-bit field to indicate the kind of exceptions in the guest OS that cause a trap into root operation (i.e., VMM).

IO-bitmap addresses—A memory region with 8 KB in size, each bit of which corresponds to one 32 byte region in the 10 space. If the corresponding bit is set to 1 and "activate IO map" bit is also 1, then accessing the 32 byte IO region causes the guest OS to trap into VMM.

Memory management—To ensure a guest OS can't access the memory that does not belong to it, VT-x introduces a series of features that work together to accomplish this goal. For example, CR3 is a control register that holds the physical address of the root of page table. Any attempt to change CR3 by a guest OS causes a trap into VMM. From there, the VMM can provide a shadow page table to the guest OS, manipulation of which is always tracked and checked by VMM.

There are many possible ways to achieve strong security and isolation among multiple OSes in OS switching with VT-x. In one embodiment, the legacy mode is mapped into the non-root operation mode in VT-x while the switcher code is implemented in the root operation mode (ring 0 specifically). In order to ensure the continuing running of the OSes in legacy mode, certain emulations are implemented in the OS switcher, including instruction emulation for CPUID, MOV, etc.

For a paging-based operating system, to prevent access of any memory that does not belong to the OS, a shadow page table mechanism is used.

When the OS sets up a page table or modifies a page table entry through setting CR3 for the first time, it will trap into the root operation mode where the OS switcher can make a copy of the page table, which is referred to as the shadow page table. All table entries are verified to make sure none of the page table entries maps into a physical page that does not belong to the OS. Also, if the page table is included in the page table, then the page table entry is modified to be read-only in the shadow page table. Before returning to the OS, the shadow page table is used to set to CR3. Subsequently, when the OS tries to modify any table entry, a trap into the OS switcher will happen since the page table area is mapped as read-only. The OS switcher can validate the modification and propagates the change to the both original page table and shadow page table. It then resumes the execution as usual. Through this constant checking and validation of page table entries, the OS switcher ensures any OS won't access any memory region that does not belong to the OS.

As discussed above, a key for forced control transfer is to identify the policy implementation hardware. Once identified, operations are performed to make sure the policy implementation hardware cannot be modified by OSes and to ensure their interrupts are securely delivered to the OS switcher.

On an IA-32 system, an OS can access a device through IO instruction or a memory-mapped IO operation. If a policy implementation device is accessed through an IO instruction, the OS switcher sets the IO bitmap addresses so that a guest OS cannot read or write to that corresponding region in the IO space. If a device is accessed through memory-mapping, similar to what is discussed above for memory isolation, the OS switcher checks to make sure the policy implementation devices are not mapped into any OS, so that these devices are inaccessible to them.

Interrupts for the policy implementation devices are securely delivered to the OS switcher by routing all interrupts to the OS switcher. For the interrupts that OS switcher is not interested in, the OS switcher forwards them to the current active OS. Otherwise, it will act on the interrupt properly.

In order to secure the interrupt delivery and device access, any intermediate devices that sit between the CPU and the policy implementation devices are protected from guest OSes as well, possibly using the same scheme as protecting the policy implementation devices.

Secure Exclusive Partition

In one OS switching embodiment, all hardware resources are exposed to the active OS. Some are time-multiplexed and some are partitioned. Partial partitioning, such as a memory split and exclusive partitioning, require cooperation from OSes. With the new hardware capabilities such as TrustZone and VT-x, such partitioning becomes possible. Equally feasible is to enforce partitioning for other hardware resources, such as Ethernet controller. For example, if the Ethernet controller belongs to one OS exclusively, the protection controller in TrustZone may be used or use the page entry validation with VT-x to control access to the Ethernet controller so that only the owner OS can access it.

An Example of a Computer System

Figure 7:
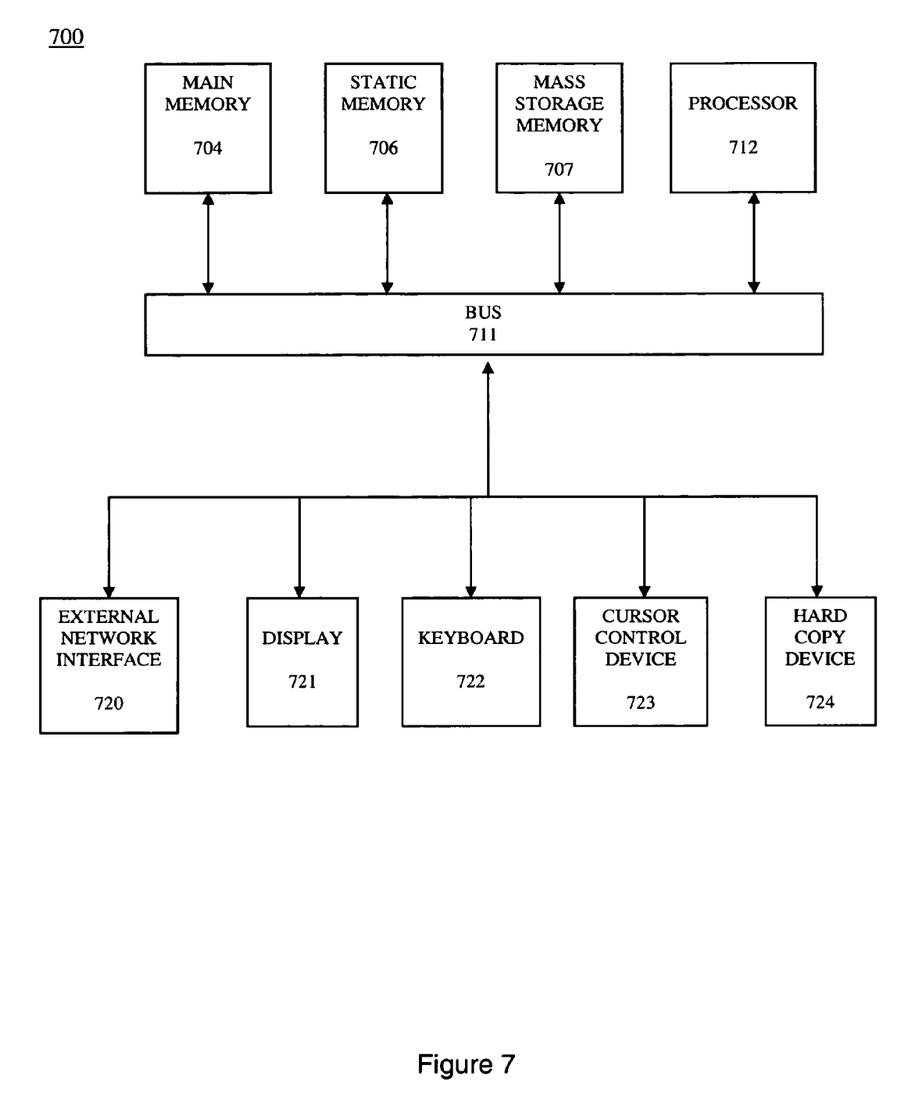
FIG. 7 is a block diagram of an exemplary computer system.

FIG. 7 is a block diagram of an exemplary computer system that may perform one or more of the operations described herein. Referring to FIG. 7, computer system 700 may comprise an exemplary client or server computer system. Computer system 700 comprises a communication mechanism or bus 711 for communicating information, and a processor 712 coupled with bus 711 for processing information. Processor 712 includes a microprocessor, but is not limited to a microprocessor, such as, for example, Pentium™, PowerPC™, Alpha™, etc.

System 700 further comprises a random access memory (RAM), or other dynamic storage device 704 (referred to as main memory) coupled to bus 711 for storing information and instructions to be executed by processor 712. Main memory 704 also may be used for storing temporary variables or other intermediate information during execution of instructions by processor 712.

Computer system 700 also comprises a read only memory (ROM) and/or other static storage device 706 coupled to bus 711 for storing static information and instructions for processor 712, and a data storage device 707, such as a magnetic disk or optical disk and its corresponding disk drive. Data storage device 707 is coupled to bus 711 for storing information and instructions.

Computer system 700 may further be coupled to a display device 721, such as a cathode ray tube (CRT) or liquid crystal display (LCD), coupled to bus 711 for displaying information to a computer user. An alphanumeric input device 722, including alphanumeric and other keys, may also be coupled to bus 711 for communicating information and command selections to processor 712. An additional user input device is cursor control 723, such as a mouse, trackball, trackpad, stylus, or cursor direction keys, coupled to bus 711 for communicating direction information and command selections to processor 712, and for controlling cursor movement on display 721.

Another device that may be coupled to bus 711 is hard copy device 724, which may be used for marking information on a medium such as paper, film, or similar types of media. Another device that may be coupled to bus 711 is a wired/wireless communication capability 725 to communication to a phone or handheld palm device.

Note that any or all of the components of system 700 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for enabling a plurality of operating systems to run concurrently on a computer, wherein a first operating system in the plurality of operating systems is currently active, the method comprising:
    identifying a second operating system from the plurality of operating systems that is to be active next, the second operating system having the same privileges to system resources as the first operating system for operation system switching;
    causing a memory access controller to enable exclusive access to a portion of memory for the second operating system once the second operating system becomes active;
    causing the second operating system to become active;
    determining that a forcible switching event occurred, wherein identifying the second operating system that is to be active next occurs in response to determining that the forcible switching event has occurred, wherein a forcible switch can occur between any two operating systems in the plurality of operating systems;
    performing a forced control transfer; and
    initiating operating system switching in response to an operating system switching event,
    wherein the forcible switching event occurs after a currently active operating system fails to become inactive and fails to allow the second operating system to become active, and
    wherein the operating system switching event is generated in response to a switching button being depressed.

2. The method defined in claim 1 wherein causing the second operation system to become active comprises performing a resume operation for the second operating system to cause the second operating system to resume operation.

3. The method defined in claim 1 wherein the operating system switching event is a user event.

4. The method defined in claim 1 wherein the switching button is mapped as a secure device with state that the plurality of operating systems cannot alter and one or more interrupts that the plurality of operating systems cannot block.

5. The method defined in claim 1 wherein the operating system switching event is generated after a timer reaches a predetermined time, where the timer is trigger to run in response to the switching button being depressed.

6. The method defined in claim 1 wherein causing the memory access controller to enable exclusive access to a portion of memory for the second operating system once the second operating system becomes active comprises statically partitioning memory into non-secure memory that is accessible by the second operating system and secure memory that is not accessible to the second operating system.

7. The method defined in claim 6 wherein the secure memory and non-secure memory include portions of memory on a chip.

8. The method defined in claim 1 further comprising monitoring for memory access violation by one or more operating systems in the plurality of operating systems other than the second operating system.

9. The method defined in claim 1 further comprising: the second operating system performing a resume operation.

10. The method defined in claim 9 wherein the second operating system performing a resume operation comprises:
    one or more drivers of the second operating system restoring hardware device states;
    a kernel in the second operating system restoring and resuming operation of one or more subsystems; and
    resuming normal operation by the second operating system.

11. The method defined in claim 9 further comprising:
receiving an indication to switch from a currently active operating system to the second operating system; and
the currently active operating system saving state associated with the currently active operating system.

12. The method defined in claim 11 wherein receiving the indication is in response to a user action or an operating system event.

13. The method defined in claim 1 further comprising:
the first operating system performing a suspend operation.

14. The method defined in claim 13 wherein the first operating system performing a suspend operation comprises:
saving state associated with one or more sub-systems and one or more hardware devices.

15. An article of manufacture having one or more non-transitory computer readable storage media storing instructions thereon which, when executed by a system, cause the system to perform a method for enabling a plurality of operating systems to run concurrently on a computer, wherein a first operating system in the plurality of operating systems is currently active, the method comprising:
identifying a second operating system of a plurality of operating systems that is to be active next, the second operating system having the same privileges to system resources as the first operating system for operation system switching;
causing a memory access controller to enable exclusive access to a portion of memory for the second operating system once the second operating system becomes active;
causing the second operating system to become active;
determining that a forcible switching event occurred, wherein identifying the second operating system that is to be active next occurs in response to determining that the forcible switching event has occurred, wherein a forcible switch can occur between any two operating systems in the plurality of operating systems;
performing a forced control transfer; and
initiating operating system switching in response to an operating system switching event,
wherein the forcible switching event occurs after a currently active operating system fails to become inactive and fails to allow the second operating system to become active, and
wherein the operating system switching event is generated in response to a switching button being depressed.

16. The article of manufacture defined in claim 15 wherein causing the second operation system to become active comprises performing a resume operation for the second operating system to cause the second operating system to resume operation.

17. The article of manufacture defined in claim 15 wherein the switching button is mapped as a secure device with state that the plurality of operating systems cannot alter and one or more interrupts that the plurality of operating systems cannot block.

18. The article of manufacture defined in claim 15 wherein causing the memory access controller to enable exclusive access to a portion of memory for the second operating system once the second operating system becomes active comprises statically partitioning memory into non-secure memory that is accessible by the second operating system and secure memory that is not accessible to the second operating system.

19. The article of manufacture defined in claim 15 further comprising:
the second operating system performing a resume operation.

20. The article of manufacture defined in claim 19 further comprising:
receiving an indication to switch from a currently active operating system to the second operating system; and
the current operating saving state associated with the currently active operating system.

21. The article of manufacture defined in claim 20 wherein receiving the indication is in response to a user action or an operating system event.

22. A system for enabling a plurality of operating systems to run concurrently on a computer, wherein a first operating system in the plurality of operating systems is currently active, said system comprising:
a memory;
a processor, in communications with the memory and configured to perform:
identifying a second operating system of a plurality of operating systems that is to be active next, the second operating system having the same privileges to system resources as the first operating system for operation system switching;
causing a memory access controller to enable exclusive access to a portion of memory for the second operating system once the second operating system becomes active;
causing the second operating system to become active;
determining that a forcible switching event occurred, wherein identifying the second operating system that is to be active next occurs in response to determining that the forcible switching event has occurred, wherein a forcible switch can occur between any two operating systems in the plurality of operating systems;
performing a forced control transfer; and
initiating operating system switching in response to an operating system switching event,
wherein the forcible switching event occurs after a currently active operating system fails to become inactive and fails to allow the second operating system to become active, and
wherein the operating system switching event is generated in response to a switching button being depressed.

* * * * *